United States Patent
Li

(10) Patent No.: US 7,098,847 B2
(45) Date of Patent: Aug. 29, 2006

(54) METHOD FOR CALIBRATING SMART ANTENNA ARRAY IN REAL TIME

(75) Inventor: Shihe Li, Beijing (CN)

(73) Assignee: Da Tang Mobile Communications Equipment Co., Ltd., (CN)

( * ) Notice: Subject to any disclaimer, the term of this patent is extended or adjusted under 35 U.S.C. 154(b) by 0 days.

(21) Appl. No.: 11/078,906

(22) Filed: Mar. 11, 2005

(65) Prior Publication Data

US 2005/0239506 A1 Oct. 27, 2005

Related U.S. Application Data

(63) Continuation of application No. PCT/CN03/00779, filed on Sep. 15, 2003.

(30) Foreign Application Priority Data

Sep. 13, 2002 (CN) .................................. 02131218

(51) Int. Cl.
*H01Q 3/26* (2006.01)

(52) U.S. Cl. ...................................... 342/368; 342/174

(58) Field of Classification Search ................ 342/165, 342/173, 174, 368, 369, 373
See application file for complete search history.

(56) References Cited

U.S. PATENT DOCUMENTS

| | | | |
|---|---|---|---|
| 6,124,824 A * | 9/2000 | Xu et al. ..................... | 342/174 |
| 6,236,839 B1 | 5/2001 | Gu et al. | |
| 6,600,445 B1 | 7/2003 | Li | |
| 6,940,453 B1 * | 9/2005 | Kim .......................... | 342/368 |
| 2004/0214604 A1 * | 10/2004 | Yoon et al. ............... | 455/562.1 |
| 2005/0047384 A1 * | 3/2005 | Wax et al. .................. | 370/338 |
| 2005/0227628 A1 * | 10/2005 | Inanoglu ...................... | 455/68 |

* cited by examiner

*Primary Examiner*—Dao Phan

(57) ABSTRACT

A real-time calibration method for a smart antenna array. The method includes: before installation, a smart antenna array is pre-calibrated to obtain transmission-coefficient matrix between antenna units; after installation at site, the pre-calibrated transmission-coefficient matrix is loaded in a base station to which the smart antenna array connects; during running, every transmission link of the base station transmits a unit calibration signal in sequence in a time-slot, and all other links, except the transmitting link, are in a reception state to receive the unit calibration signal, and the received unit calibration signals are recorded; with the received unit calibration signals and pre-calibrated transmission-coefficient matrix, the smart antenna array is calibrated. The method does not need beacon antenna, coupled structure of the antenna array and a special calibration link.

20 Claims, 7 Drawing Sheets

METHOD FOR CALIBRATING SMART ANTENNA ARRAY IN REAL TIME

CROSS-REFERENCE TO RELATED APPLICATIONS

This application is a continuation of International Application No. PCT/CN2003/000779, filed Sep. 15, 2003. This application claims the benefit of Chinese Patent Application No. 02131218.4 filed on Sep. 13, 2002. The disclosures of the above applications are incorporated herein by reference.

FIELD OF THE INVENTION

The present invention relates to the smart antenna technology of a wireless communication system, more specifically to a real-time calibration method of a smart antenna array.

BACKGROUND OF THE INVENTION

In the modern wireless communication system, usually the smart antenna is deployed in order to raise system capacity and sensitivity and to have communication for longer distance with lower transmission power.

In the China Patent CN99 1 11350.0 named "a calibration method of a smart antenna array and a device thereof", the real-time calibration device of the smart antenna includes a calibration link that is the connection of a coupled calibration network, a feeder cable, and a beacon transceiver; wherein the coupled calibration network connects with the antenna units accordingly, and the beacon transceiver connect with a baseband processor. The calibration steps are as follows: with the Vector Network Analyzer, pre-calibrating the coupled calibration network and recording transmission-coefficients of the coupled calibration network for receiving and transmitting; making receiving calibration: the transmission-coefficient amplitude of each receiving link is adjusted to the same as the transmission-coefficient amplitude of the reference link, and the transmission-coefficient phase difference φ between each receiving link and the reference link is stored in the baseband processor; making transmitting calibration: the transmission-coefficient amplitude of each transmitting link is adjusted to the same as the transmission-coefficient amplitude of the reference link, and the transmission-coefficient phase difference Ψ between each receiving link and the reference link is stored in the baseband processor.

In the China Patent CN01 1 20547.4 named: "A couple calibration method and network of smart antenna array for a wireless communication system", based on the last patent, the couple calibration method and device are further designed in order to solve the problems: the receiving calibration accuracy of the receiver and the transmitting calibration accuracy of the transmitter in the base station are influenced by the smart antenna installation environment and landscape; and the performance during calibration is consistent with that during production.

In the above calibration techniques, the calibration method and device of the smart antenna array must have a beacon antenna or a coupled calibration network and must have a specific calibration link. The first patent concerns about the calibration at any time, but it lacks of a specific method to calibrate the smart antenna array during it is running.

SUMMARY OF THE INVENTION

Objective of the invention is to provide a calibration method that can perform calibration during the smart antenna array is running without any beacon antenna, coupled network or calibration link, in order to make the smart antenna more practicable.

A real-time calibration method for a smart antenna array, comprises,
A) before installation, pre-calibrating the smart antenna array to obtain a pre-calibration transmission-coefficient matrix between antenna units in the smart antenna array;
B) after installation at site, loading the pre-calibration transmission-coefficient matrix into a base station to which the smart antenna array connects;
C) during the base station is running, transmitting a unit calibration signal in sequence in a time-slot by every transmitting link of the base station, and at the same time setting all other links of the smart antenna array, except the transmitting link, being in a reception state to receive the unit calibration signal, then measuring and recording the received unit calibration signal;
D) with the received unit calibration signal and the pre-calibration transmission-coefficient matrix, respectively calculating a ratio of a receiving transmission-coefficient matrix of each reception link to a receiving transmission-coefficient matrix of a reference link, and respectively calculating a ratio of transmitting transmission-coefficient matrix of each transmitting link to a transmitting transmission-coefficient matrix of the reference link.

The method of the invention is based on the fact that: a smart antenna array is a passive microwave (radio frequency) network; when structure of a smart antenna array is defined, the mutual coupling characteristic of antenna units of the smart antenna array is defined too. Therefore, the mutual coupling characteristic of a smart antenna array can be tested (pre-calibrated) at the vendor, and the transmission-coefficient matrix of antenna units is stored in the database of network management equipment (named OMC_R or LMT). At site, after installation said transmission-coefficient matrix is loaded to the base station to which the smart antenna array connects.

The smart antenna array calibration method provided by the invention works at time slots during its base station is running, so comparing with the present technique, the method is a real-time calibration method. Moreover, the method sequentially lets every transmission link transmit a unit calibration data, and takes the pre-calibration transmission-coefficient matrix loaded in the base station to calculate the parameters for calibration, so the calibration procedure and device are simplified.

For a smart antenna array with N antenna units, every link will transmit once, and other links receive the transmitted signal. Therefore, the real-time calibration repeats N times, and will take N time slots in one frame or in different frames, but in total it takes no more than 20–50 ms. Because a mobile communication system does not always work in full load, there are idle time slots, and these idle time slots can be used for real-time calibration.

For a TDD CDMA system, each link uses a same antenna unit for transmission and reception, so the pre-calibration can be done with Step A directly. For a FDD CDMA system, in order to isolate the transmission link and the reception link, the transmission and reception take different smart antenna arrays. In this case, the pre-calibration in Step A is done for two antenna arrays: transmission and reception, respectively. Furthermore, in site the relative position of said two antenna arrays is different, so the mutual transmission-coefficients of antenna units are unadjusted. In this case, some functions should be added in the transmitter and receiver. For example, the receiver can work at transmitting frequency range, and the transmitter can work at receiving frequency range; coupled circuits between each pair of receiver/transmitter and receiving-antenna-unit/transmitting-antenna-unit are added. With these changes, Step C can be used for real-time calibration for reception antenna array and transmission antenna array, respectively, in a FDD CDMA system, and this is similar to the real-time calibration of a TDD CDMA system.

With the received signal and the pre-calibration data, the reception and transmission transmission-coefficient matrix of the antenna array being calibrated can be calculated to perform the real-time calibration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
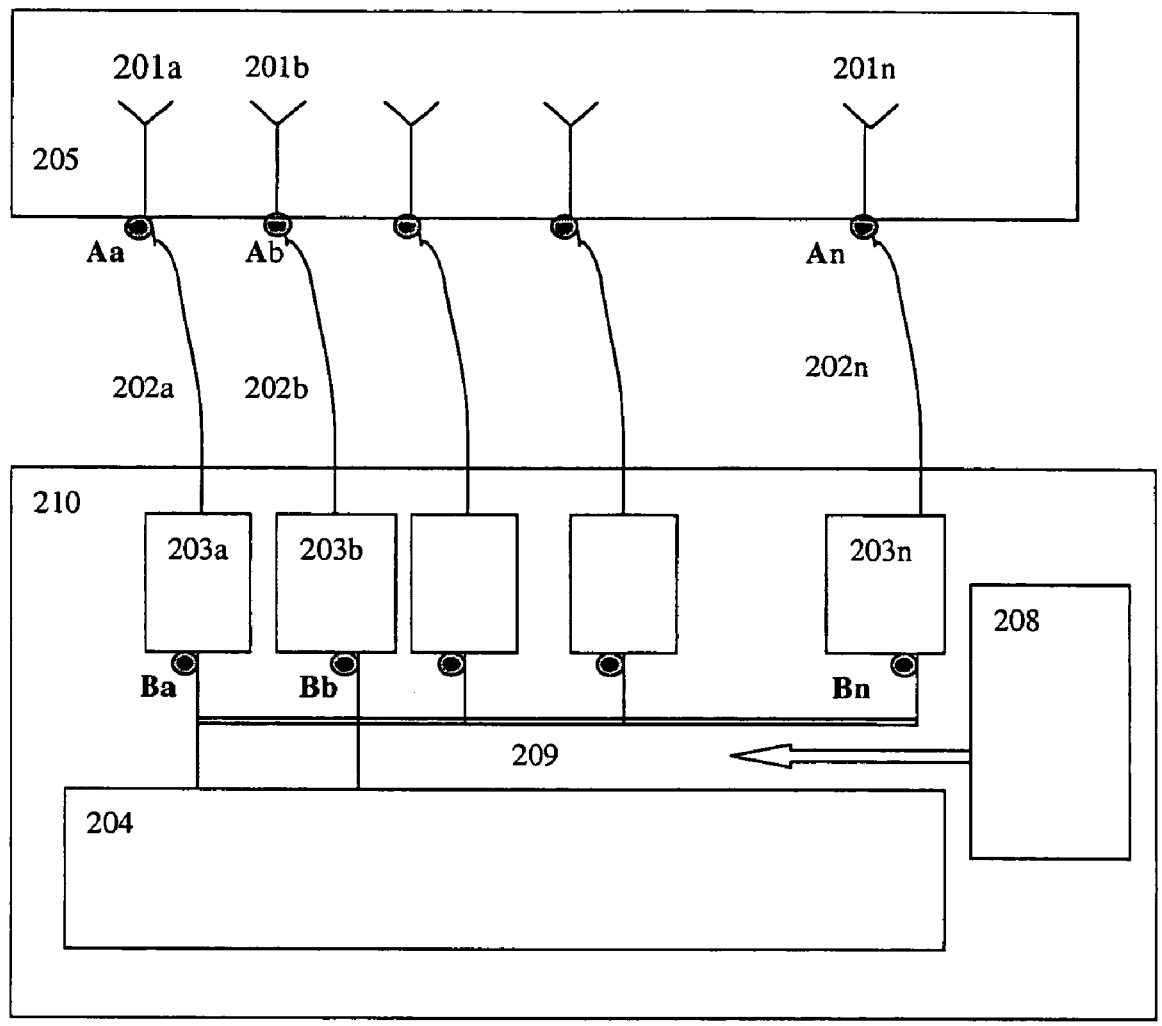
FIG. 1 shows a diagram of a base station with a smart antenna array for a Time Division Duplex communication system.

FIG. 1 shows a typical base station of a wireless communication system that is a TDD CDMA mobile communication system or a wireless local loop system. The base station includes: n (n is a positive integer) antenna units $201a$, $201b$ ... $201n$; n feeder cables $202a$, $202b$ ... $202n$ that connect n radio frequency transceivers with the antenna units; n radio frequency transceivers $203a$, $203b$ ... $203n$ and a baseband processor $204$ connected with the n radio frequency transceivers. All the radio frequency transceivers use one local oscillator $208$ to guarantee that all radio frequency transceivers are coherent.

In the smart antenna system, shown in FIG. 1, there are n links for transmitting and receiving, and each link consists of an antenna unit $201x$, a feeder cable $202x$ and a radio frequency transceiver $203x$, where x is any integer in n. Obviously, the characteristics of each link, including the transmission-coefficient amplitude and phase, are different, and will change with the environment, such as temperature, humidity and the service time etc. If $a^{th}$ link is taken as a reference link, said calibration is to obtain the transmission-coefficient amplitude and phase differences of other links with the reference link at a given carrier frequency during reception and transmission respectively. This means that the calibration is done for the whole antenna system including the antenna unit, the feeder cable and the radio frequency transceiver of every link.

When the structure of antenna array $205$ is designed more firmly, and the relative position is fixed, the characteristics of the antenna array on a certain frequency condition will not be changed with various environment. Therefore, the antenna array can be pre-calibrated.

Figure 2:
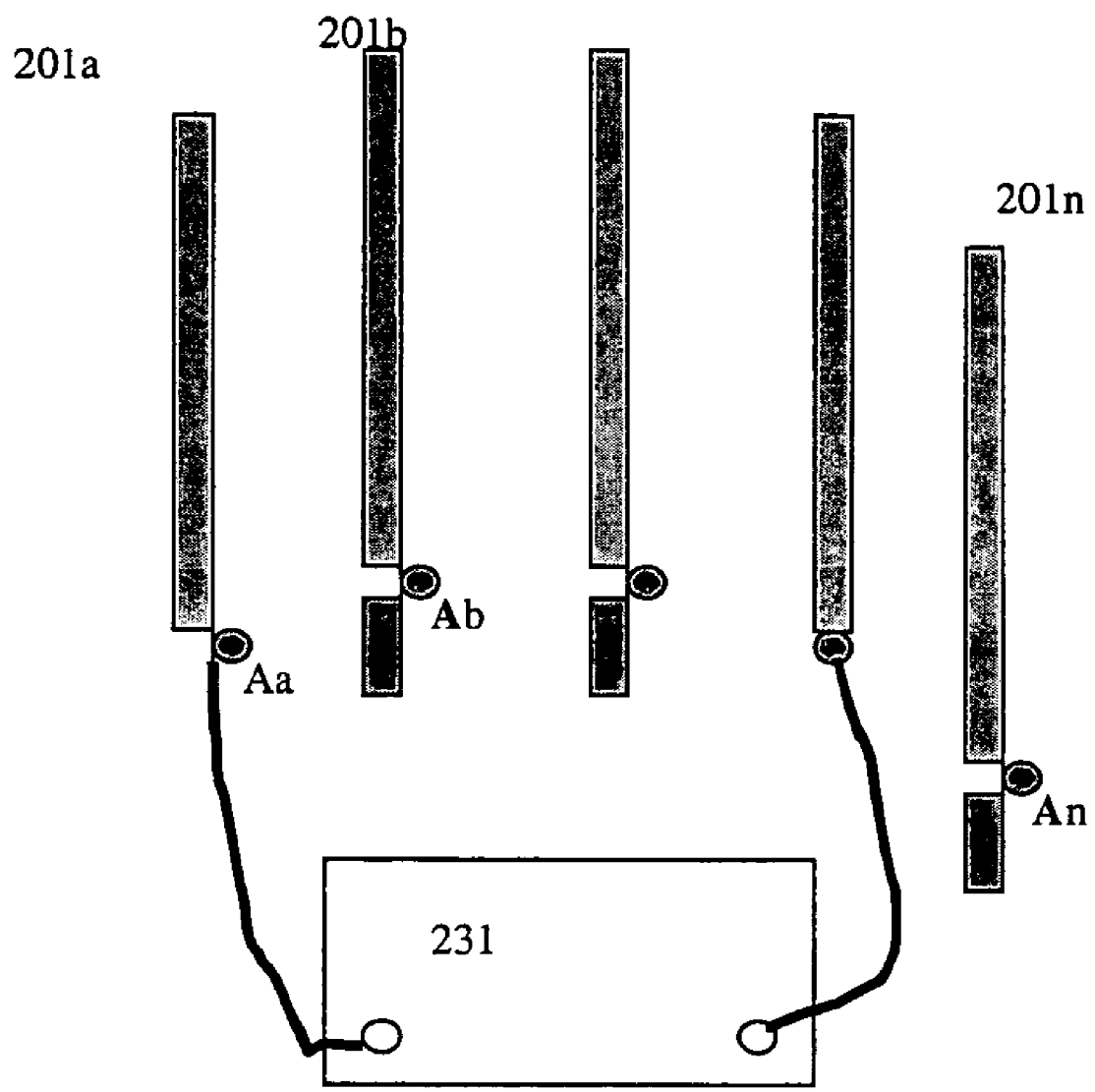
FIG. 2 shows a diagram for transmission-coefficient pre-calibration of a smart antenna array.

Refer to FIG. 2. Suppose the pre-calibration is done at the antenna unit interface point A in FIG. 1, one end of the radio frequency/microwave vector network analyzer $231$ is connected with a transmitting antenna unit, such as Aa of the antenna unit $201a$, and another end is connected with all receiving antenna units, such as Ab, Ac ... An of $201b$ ... $201n$, respectively; and then the transmission-coefficient C (a matrix) of every possible frequency can be measured. This is shown in formula (1):

$$R=CT \qquad (1)$$

Wherein the R and T are a receiving signal matrix and a transmitting signal matrix, respectively. Formula (1) shows that the receiving signal matrix equals to multiply transmission-coefficient matrix by transmitting signal matrix. During pre-calibration, C is measured by the radio frequency/microwave vector network analyzer $231$; R and T are obtained from the receiving end and transmitting end during calibration, respectively. The R and T are a column matrix with n elements, and the C is the transmission-coefficient matrix of the antenna array with n×n elements that is the result of pre-calibration. Since the receiving link and the transmitting link are interchangeable, the matrix C is symmetric, i.e.

$$Cij=Cji \qquad (2)$$

When i is a transmitting link, j is the receiving links; and when j is a transmitting link, i is the receiving links.

Before the base station with the smart antenna is put into operation, the transmission matrix C must be loaded to the base station by the network management equipment of the mobile communication system. After that, the smart antenna system can be calibrated in real-time during the base station is running.

The real-time calibration is done at the interface point B (Ba, Bb ... Bn) in FIG. 1, i.e. at the interface point between digital signal processor (the baseband processor) $204$ and each radio frequency transceiver $203a$, $203b$ ... $203n$. Suppose the uplink (reception) transmission-coefficient of $x^{th}$ link is Sx and downlink (transmission) transmission-coefficient is Yx, then the measurement result at interface point B is shown in the following formula:

$$D=DT \qquad (3)$$

Wherein the R and T are the receiving matrix and the transmitting matrix, respectively, and they are column matrix with y elements. During calibration, R and T are read out from the baseband processor 204, and D is the transmission-coefficient matrix of the smart antenna system with n×n elements. The matrix D is the function of the matrices C, S and Y. Said calibration of the smart antenna system is to calculate the transmission-coefficient difference between each receiving and transmitting link with the reference link based on the measurement.

Any link can be taken as the reference link. Suppose the first link is taken as the reference link, the calibration requirement is to obtain the followings in real-time:

Receiving transmission-coefficient ratio of the $x^{th}$ link and the reference link: Sx/S1 (x=2, 3 . . . n);

Transmitting transmission-coefficient ratio of the $x^{th}$ link and the reference link:

$$Yx/Y1 \ (x=2, 3 \ldots n) \quad (4).$$

The calibration procedure is described with reference to FIG. 2. The B interface point in FIG. 1 is connected to the radio frequency/microwave vector network analyzer 231; each link is set to the transmitting state in sequence, and when one link is in the transmitting state, the others (n−1 links) are set to the receiving state; input a unit of transmitting data to the transmitting link as the unit calibration signal, and other links receive the unit-transmitted data; then the following is obtained:

When $i^{th}$ link is the transmitting link, other links (represented by x), except the $i^{th}$ link, receive the signal as follows:

$$Rix = Yi \times Cix \times Sx \ x \neq i \quad (5).$$

Therefore, n× (n−1) received signals R are obtained (from the receivers). Since the C matrix has been known before (during pre-calibration), for the antenna system to be calibrated, the reception transmission-coefficient matrix ratios of each receiving link to the reference link, and the transmitting transmission-coefficient matrix ratios of each transmitting links to the reference link can be simply calculated.

In the following, take the number of antenna units n in an antenna array equaling to 3, 4, 6 and 8, respectively, as examples to deduce from formula (5) the calculation formulas for the reception transmission-coefficient matrix ratios of each receiving link to the reference link, and the transmitting transmission-coefficient matrix ratios of each transmitting link to the reference link. The reception transmission-coefficient matrix of the receiving links S can be summarized as follow: every link transmits in sequence, and when a link transmits, the received unit data signal of each receiving link is multiplied by the pre-calibrated transmission-coefficient between antenna unit of the said receiving link and antenna unit of the transmitting link. The transmitting transmission-coefficient matrix of the transmitting links Y can be summarized as follows: every link transmits in sequence, and when a link transmits, the received unit data signal of each receiving link is multiplied by the pre-calibrated transmission-coefficient between antenna unit of the said receiving link and antenna unit of the transmitting link. With the same principle, the calculation may take other ways.

For an antenna array with 3 antenna units, receiving transmission-coefficient matrix ratio of the other links (except the reference link) and the reference link, and, transmitting transmission-coefficient matrix ratio of the other links (except the reference link) and the reference link are calculated with the following formulas (the first antenna unit is taken as the reference link here):

$$S_2/S_1 = R_{23}C_{13}/R_{13}C_{23} \quad S_3/S_1 = R_{32}C_{12}/R_{12}C_{23} \quad (6)$$

$$Y_2/Y_1 = R_{32}C_{13}/R_{31}C_{23} \quad Y_3/Y_1 = R_{23}C_{12}/R_{21}C_{23}$$

For an antenna array with 4 antenna units, receiving transmission-coefficient matrix ratio of the other links (except the reference link) and the reference link, and, transmitting transmission-coefficient matrix ratio of the other links (except the reference link) and the reference link are calculated with the following formulas (the first antenna unit is taken as the reference link here):

$$S_2/S_1 = R_{23}C_{13}/R_{13}C_{23} \quad Y_2/Y_1 = R_{31}C_{13}/R_{32}C_{23} \quad (7)$$

$$S_3/S_1 = R_{32}C_{12}/R_{12}C_{23} \quad Y_3/Y_1 = R_{23}C_{12}/R_{21}C_{23}$$

$$S_4/S_1 = R_{42}C_{12}/R_{12}C_{24} \quad Y_4/Y_1 = R_{34}C_{13}/R_{31}C_{34}$$

For an antenna array with 6 antenna units, receiving transmission-coefficient matrix ratio of the other links (except the reference link) and the reference link, and, transmitting transmission-coefficient matrix ratio of the other links (except the reference link) and the reference link are calculated with the following formulas (the first antenna unit is taken as the reference link here):

$$S_2/S_1 = R_{23}C_{13}/R_{13}C_{23} \quad Y_2/Y_1 = R_{32}C_{13}/R_{31}C_{23} \quad (8)$$

$$S_3/S_1 = R_{32}C_{12}/R_{12}C_{23} \quad Y_3/Y_1 = R_{23}C_{12}/R_{21}C_{23}$$

$$S_4/S_1 = R_{42}C_{12}/R_{12}C_{24} \quad Y_4/Y_1 = R_{54}C_{13}/R_{31}C_{45}$$

$$S_5/S_1 = R_{52}C_{12}/R_{12}C_{23} \quad Y_5/Y_1 = R_{45}C_{14}/R_{41}C_{43}$$

$$S_6/S_1 = R_{62}C_{12}/R_{12}C_{26} \quad Y_6/Y_1 = R_{56}C_{15}/R_{51}C_{56}$$

For an antenna array with 8 antenna units, receiving transmission-coefficient matrix ratio of the other links (except the reference link) and the reference link, and, transmitting transmission-coefficient matrix ratio of the other links (except the reference link) and the reference link, are calculated with the following formulas (the first antenna unit is taken as the reference link here):

$$S_2/S_1 = R_{23}C_{13}/R_{13}C_{23} \quad Y_2/Y_1 = R_{32}C_{13}/R_{31}C_{23} \quad (9)$$

$$S_3/S_1 = R_{32}C_{12}/R_{12}C_{23} \quad Y_3/Y_1 = R_{23}C_{12}/R_{21}C_{23}$$

$$S_4/S_1 = R_{42}C_{12}/R_{12}C_{24} \quad Y_4/Y_1 = R_{54}C_{13}/R_{31}C_{45}$$

$$S_5/S_1 = R_{52}C_{12}/R_{12}C_{23} \quad Y_5/Y_1 = R_{45}C_{14}/R_{41}C_{43}$$

$$S_6/S_1 = R_{62}C_{12}/R_{12}C_{26} \quad Y_6/Y_1 = R_{67}C_{16}/R_{61}C_{57}$$

$$S_7/S_1 = R_{72}C_{12}/R_{12}C_{27} \quad Y_7/Y_1 = R_{87}C_{18}/R_{81}C_{78}$$

$$S_8/S_1 = R_{82}C_{12}/R_{12}C_{28} \quad Y_8/Y_1 = R_{78}C_{17}/R_{71}C_{78}$$

Figure 3:
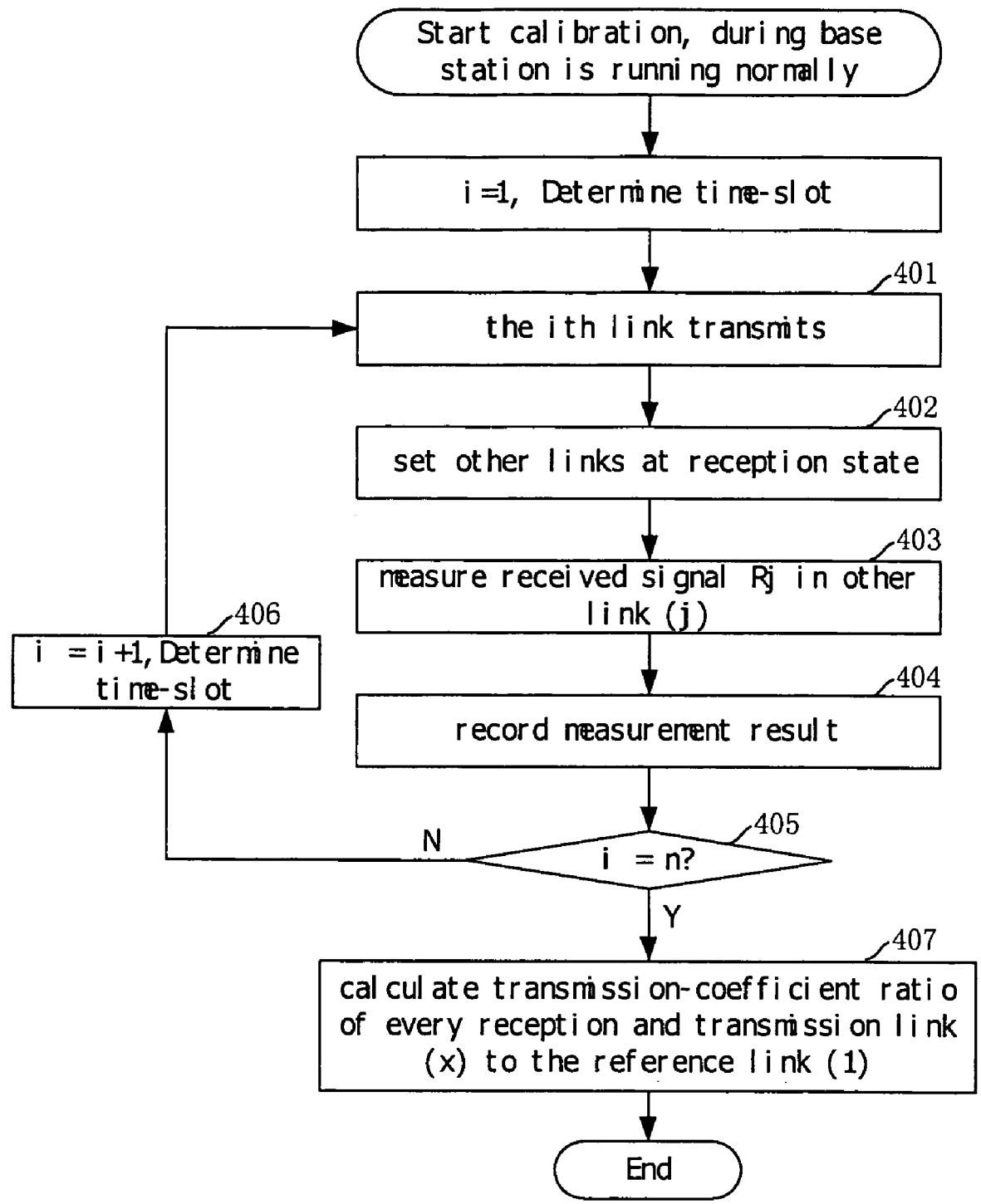
FIG. 3 shows a flowchart of the invention for calibrating a TDD-CDMA mobile communication system.

FIG. 3 shows the real-time calibration flowchart for a TDD CDMA mobile communication system. Suppose the smart antenna array has n antenna units, and the base station is running normally. The real-time calibration starts by setting i=1 and a idle time slot, and $t^{th}$ link is the reference link.

Step 401, Set the i$^{th}$ antenna unit (i=1, 2 ... n) at the transmitting state and transmit a unit data, naturally the first link i=1 is the transmitting link;

Step 402, Set the other n−1 links at the receiving states that receive the unit data sent by the transmitting link;

Step 403, With the radio frequency/microwave vector network analyzer, the received signals of the n−1 receiving links Rji (j=1, 2 ... n; and j≠i) are measured one by one;

Step 404, Record the n−1 measurements of this time;

Step 405, Detect whether i equals to n, when i≠n go to Step 406 and when i=n go to Step 407;

Step 406, Calculate i=i+1 and determine a time slot, and then execute Steps 401 to 405 again;

Step 407, Calculate each receiving transmission-coefficient ratio of the other links (except the reference link) and the reference link Si/St, and each transmitting transmission-coefficient ratio of the other links (except the reference link) and the reference link Yi/Yt, and then the real-time calibration is ended.

Figure 4:
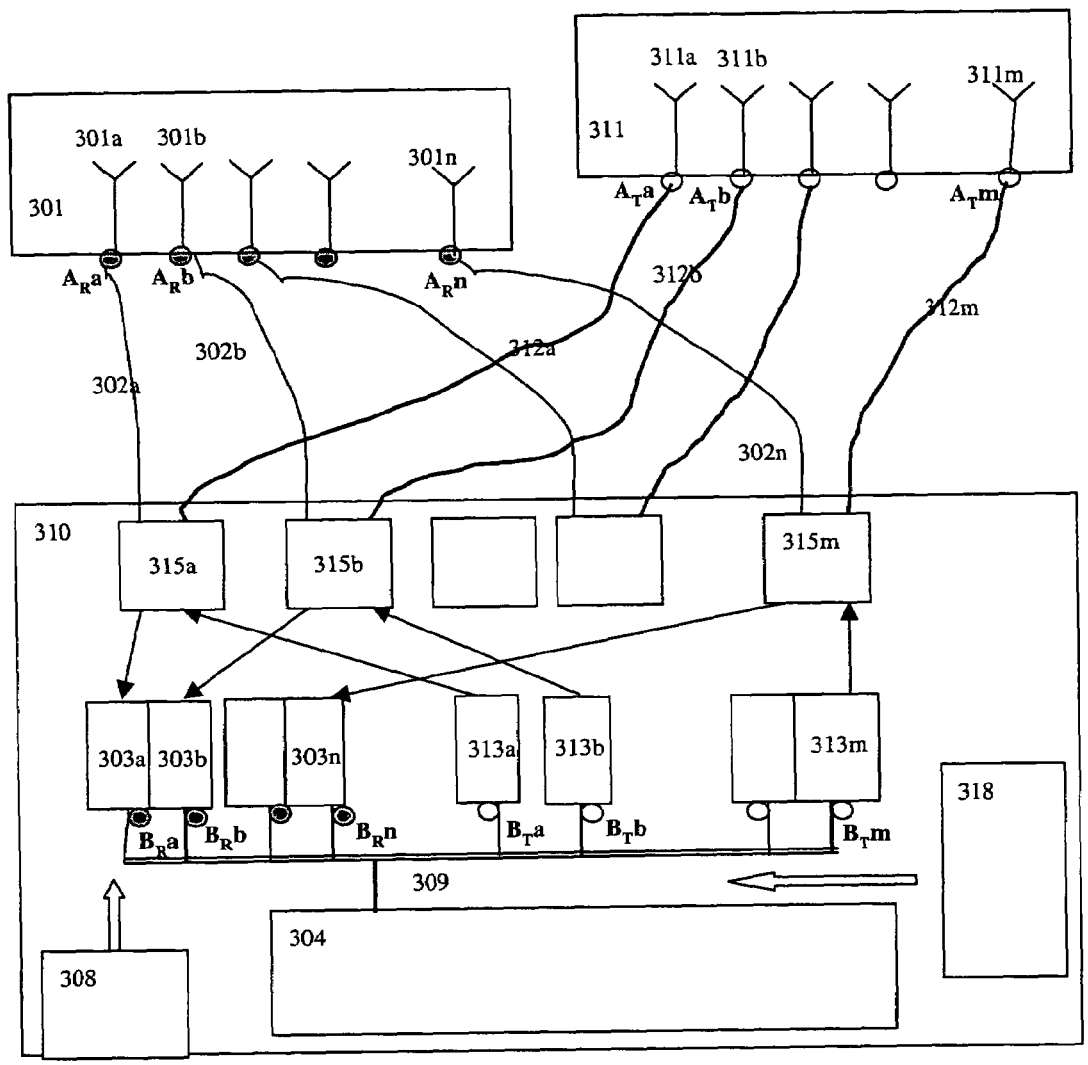
FIG. 4 shows a diagram of a base station with smart antenna arrays for a FDD-CDMA mobile communication system.

FIG. 4 shows a typical base station with a smart antenna in a FDD CDMA wireless communication system or a wireless loop system. The base station includes the following main parts: two antenna arrays: The receiving antenna array 301, which consists of n antenna units 301a, 301b ... 301n, and the transmitting antenna array 302, which consists of m antenna units 311a, 311b ... 311m; there are n receiving feeder cables 302a, 302b ... 302n and m transmitting feeder cables 312a, 312b ... 312m; there are n radio frequency receivers 303a, 303b ... 303n and m radio frequency transmitters 313a, 313b ... 313m; and the baseband processor 304. The n and m are the number of antenna units for the receiving antenna array and the transmitting antenna array, respectively, and they may be equal or non-equal. Correspondingly, there are n receivers 303 and m transmitters 313 (including power amplifiers) in the system. All receivers 303 and transmitters 313 have the same benchmark clock, and the receiving local oscillator 308 and the transmitting local oscillator 309 are locked on the benchmark clock in order to make radio frequency transceivers are coherent. As shown in FIG. 4, there is a coupled circuit 315 between each pair of the receiving antenna unit 301 and the transmitting antenna unit 311, and between each pair of the receiver 303 and the transmitter 313. There are m coupled circuit 315a, 315b, ... 315m shown in FIG. 4.

The pre-calibration procedure of two-antenna array is same as the TDD system, shown in FIG. 2. During pre-calibration, the radio frequency/microwave vector network analyzer measures points $A_R a$, $A_R b$ ... $A_R n$ and $A_T a$, $A_T b$ ... $A_T m$; and after installation, it measures points $B_R a$, $B_R B$ ... $B_R n$ and $B_T a$, $B_T b$ ... $B_T m$. With the measurement, the transmission-coefficient matrices of two antenna arrays, including the transmission-coefficient matrix of the receiving antenna array $C_R$ and the transmission-coefficient matrix of the transmitting antenna array $C_T$, are obtained. Since the relative position of the two antenna arrays is not fixed, the transmission-coefficient matrix between them cannot be calibrated at site. Nevertheless, the basic calibration requirement for a smart antenna system is the same (see formula (4)), which that is to obtain the transmission-coefficient difference of every receiving link and the reference link and to obtain the transmission-coefficient difference of every transmitting link and the reference link.

In order that the invention can be used in a FDD system, a coupled circuit 315, shown in FIG. 4, is added between each pair of the receiving antenna unit 301 and transmitting antenna unit 311 and between the receiver 303 and transmitter 313. This means that the receiver can measure the signal with transmitting frequency when the transmitting antenna array is calibrated and the transmitter can transmit the signal with receiving frequency when the receiving antenna array is calibrated.

Figure 5:
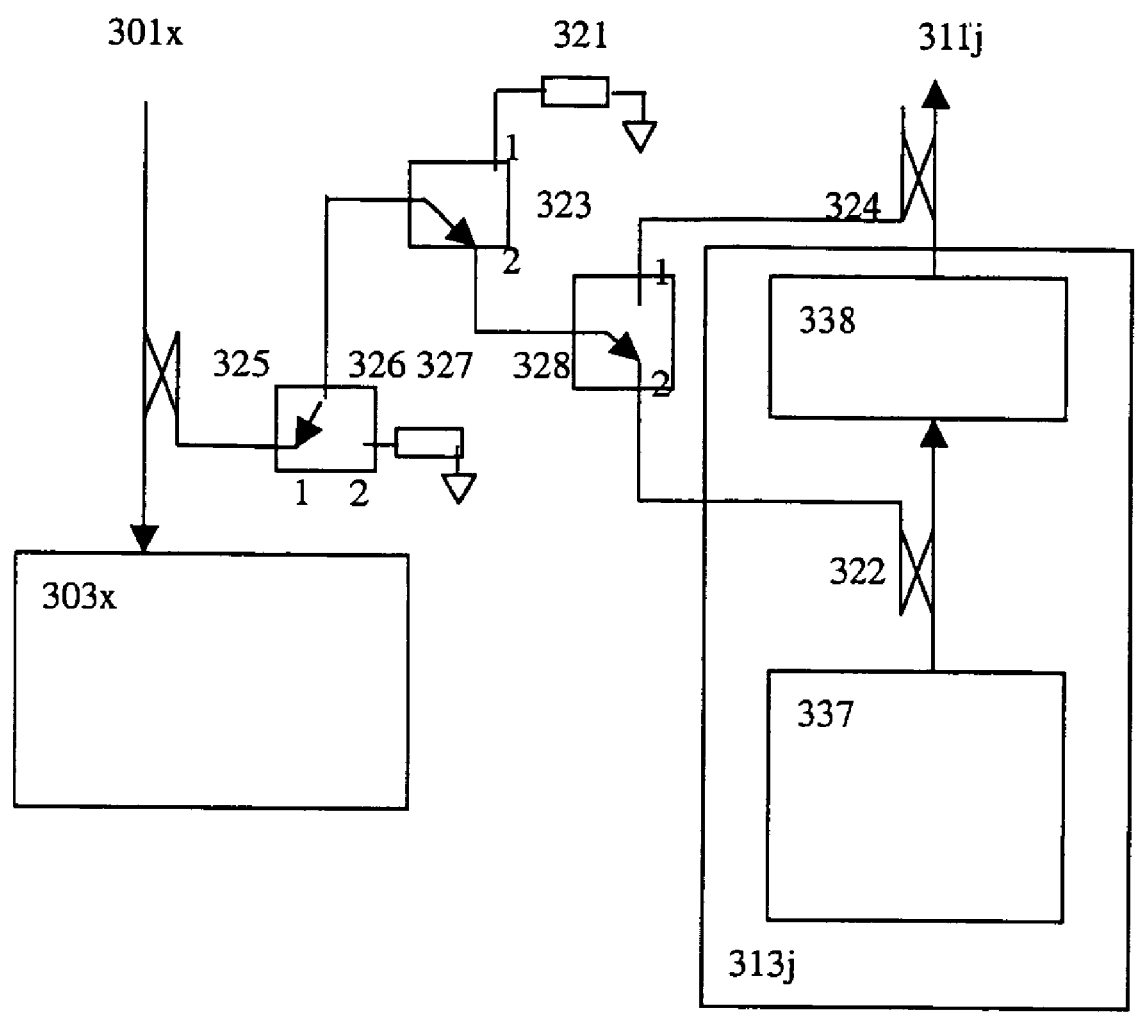
FIG. 5 shows a coupled circuit between radio frequency transceivers in FIG. 4.

FIG. 5 shows the coupled circuit that is suitable for the number of antenna unit of the receiving antenna array n is not less than the number of antenna unit of the transmitting antenna array m. The coupled circuit should have the following functions:

during calibration of transmitting antenna array, the receiver local oscillator must provides the frequency signal that is suitable to transform the transmitted calibration radio frequency signal to a receivable middle frequency signal that can be received by the baseband processor;

during calibration of receiving antenna array, the transmitter local oscillator must provide the frequency signal so that the transmitted calibration RF signal has the same frequency as the receivable signal of the base station.

In FIG. 5, suppose the receiver of a receiving link is 303x, the receiving antenna unit is 301x, and the transmitter of a transmitting link is 313j, the transmitting antenna unit is 311j; there is a coupled circuit between the receiver and transmitter. The coupled circuit consists of first, second and third couplers 325, 324 and 322, first, second and third radio frequency switches 326, 323 and 328, and the match resistances 327 and 321.

The first coupler 325 is connected between the receiving antenna unit 301x and the receiver 303x, and the first coupler 325 is also connected with the end 1 of the first radio frequency switch 326. The end 2 of the first radio frequency switch 326 is connected with the match resistance 327, and the radio frequency switch 326 is serially connected with the second radio frequency switch 323. The end 1 of the radio frequency switch 323 is connected with the match resistance 321, and the end 2 of the radio frequency switch 323 is connected with the third radio frequency switch 328. The end 1 of the third radio frequency switch 328 is connected to the output of the transmitter power amplifier 338 and the transmitting antenna unit 311j, through the second coupler 324; the end 2 of the third radio frequency switch 328 is connected to the output of the transmitter unit 337, through the third coupler 322. The base station automatically controls all the radio frequency switches 326, 323 and 328. All the couplers 325, 324 and 322 are the general radio frequency coupled circuit, and the coupling factor is controlled between −20 to −40 dB.

When the base station works normally, the first radio frequency switch 326 connects to the end 2, the second radio frequency switch 323 connects to the end 1 and the third radio frequency switch 328 connects to the end 2 to make the system has been isolation between the receiving and transmitting antenna arrays.

When the number of the transmitting antenna units is greater than the number of receiving antenna units, i.e. m>n, some changes need to be done in the FIG. 5, but engineers who are familiar with the microwave technology can do it well. The patent application will not give all the possible alternatives.

Figure 6:
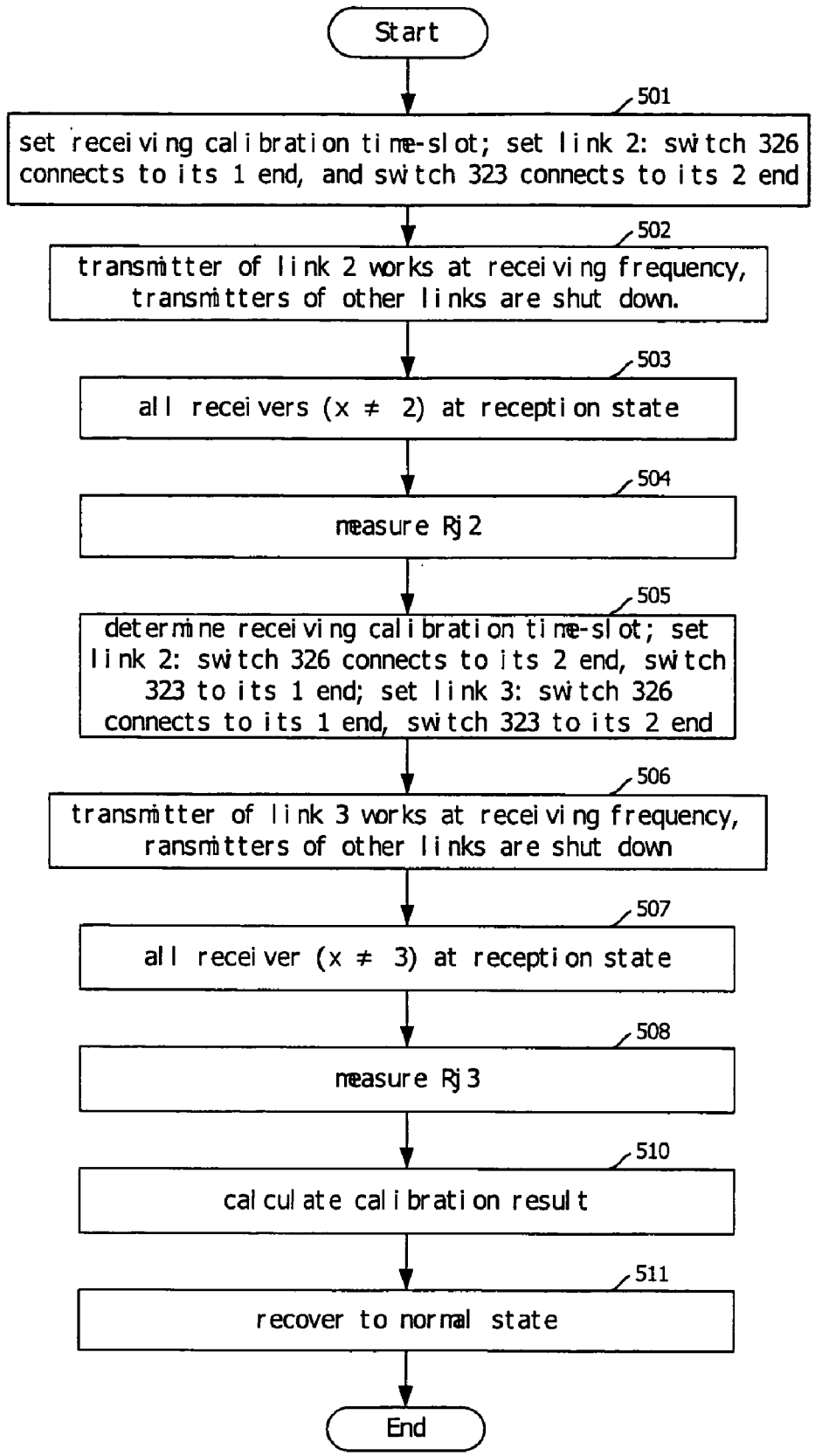
FIG. 6 shows a flowchart of invention for calibrating the reception antenna array of a FDD-CDMA mobile communication system.
Figure 7:
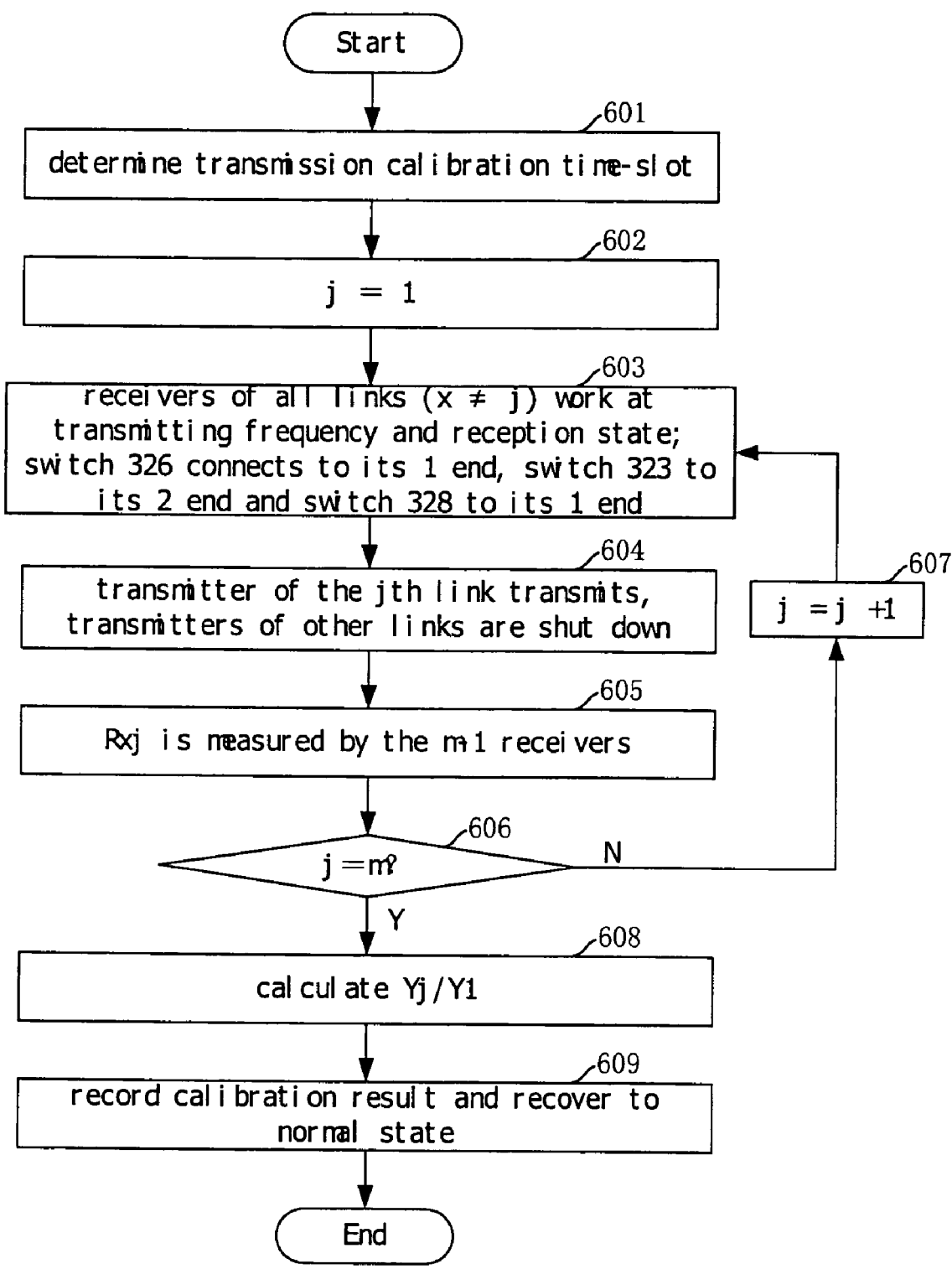
FIG. 7 shows a flowchart of invention for calibrating the transmission antenna array of a FDD-CDMA mobile communication system.

FIGS. 6 and 7 show the real-time calibration procedure of a smart antenna for the FDD system. For simplicity, take a smart antenna array with three links (links 1, 2 and 3) as an example to explain the calibration procedures of the receiving antenna array and the transmitting antenna array.

FIG. 6 shows the calibration procedure of the receiving antenna array. Suppose first link (a) is the reference link (any link can be set as the reference link). When the first link are set at transmitting state, the coupled circuits of the second and third links are set as follow: the radio frequency switch 326 connects to its end 1; the radio frequency switch 323 connects to its end 2; and shut down all power amplifiers 338. After that, the second and third links are set at transmitting states in sequence and work at the received signal frequency; input a unit of transmitted data in baseband, and at the same time open all the receiver; there are n−1 links, i.e. two links in this case, at receiving states to receive the transmitted data above; and then the followings are obtained:

When the $i^{th}$ link transmits, other interface (x) receive signals as follow:

$$Rxi = Yi \times C_R xi \times Sx \quad x \neq i \qquad (10).$$

From this formula, 2× (n−1) received signals are read, and the Rxi can be obtained from the receiver. Since $C_R$ matrix is known (the pre-calibration data), the ratio of the reception transmission-coefficient matrix of the receiving links and the reception transmission-coefficient matrix of the reference link can be calculated, and the calibration is completed.

FIG. 6 shows the calibration procedure as follows, where link 1 in the smart antenna including links 1, 2, and 3 is set as the reference link (any link can be set as the reference link);

Step 501, The base station determines the reception calibration time-slot and sets link 2 at the transmitting state; radio frequency switch 326 is connected to its end 1, and radio frequency switch 323 is connected to its end 2; radio frequency switch 328 is connected to its end 2; so the transmitter is coupled with the receiver through the coupled circuit;

Step 502, Let the transmitter of link 2 work at reception frequency, and transmitters of other links are shut down;

Step 503, Let receivers of links x≠2 work at the receiving state;

Step 504, with the radio frequency/microwave vector network analyzer, the receiving matrices $R_{i2}$ (i=1, 3) are measured at every antenna system interface;

Step 505, The base station determines the reception calibration time-slot, and the link 2 is set with connecting the radio frequency switch 326 to the end 2 and the radio frequency switch 323 to the end 1, and link 3 is set through connecting the radio frequency switch 326 to the end 1 and the radio frequency switch 323 to the end 2;

Step 506, Let the transmitter of link 3 work at reception frequency and shut down transmitters of all other links;

Step 507, Let receivers of links x≠3 work at the receiving state;

Step 508, With the radio frequency/microwave vector network analyzer, the receiving matrices $R_{i3}$ (i is any receiver with x≠3) are measured at every antenna system interface;

Step 510, Calculate calibration result $S_i/S_1$;

Step 511, the real-time calibration is ended, and the system recovers to the normal operation state.

As an example, the calculation formulas are given in the following, when the number of the antenna units of a smart antenna array equals to 3, 4, 6 and 8, respectively, and link 1 is set as the reference link, and $S_1$ is the reception transmission-coefficient matrix of the reference link.

For an antenna array with three antenna units, all links, except the reference link, have the following formulas that show the ratio of the link reception transmission-coefficient matrix to the reference link reception transmission-coefficient matrix:

$$S_2/S_1 = R_{23}C_{RI3}/R_{13}C_{R23} \qquad (11)$$

$$S_3/S_1 = R_{32}C_{RI2}/R_{12}C_{R23}.$$

For an antenna array with four antenna units, all links, except the reference link, have the following formulas that show the ratio of the link reception transmission-coefficient matrix to the reference link reception transmission-coefficient matrix:

$$S_2/S_1 = R_{23}C_{RI3}/R_{13}C_{R23} \qquad (12)$$

$$S_3/S_1 = R_{32}C_{RI2}/R_{12}C_{R23}$$

$$S_4/S_1 = R_{42}C_{RI2}/R_{12}C_{R24}.$$

For an antenna array with six antenna units, all links, except the reference link, have the following formulas that show the ratio of the link reception transmission-coefficient matrix to the reference link reception transmission-coefficient matrix:

$$S_2/S_1 = R_{23}C_{RI3}/R_{13}C_{R23} \qquad (13)$$

$$S_3/S_1 = R_{32}C_{RI2}/R_{12}C_{R23}$$

$$S_4/S_1 = R_{42}C_{RI2}/R_{12}C_R$$

$$S_5/S_1 = R_{52}C_{RI2}/R_{12}C_{R23}$$

$$S_6/S_1 = R_{62}C_{RI2}/R_{12}C_{R26}.$$

For an antenna array with eight antenna units, all links, except the reference link, have the following formulas that show the ratio of the link reception transmission-coefficient matrix to the reference link reception transmission-coefficient matrix:

$$S_2/S_1 = R_{23}C_{RI3}/R_{13}C_{R23} \qquad (14)$$

$$S_3/S_1 = R_{32}C_{RI2}/R_{12}C_{R23}$$

$$S_4/S_1 = R_{42}C_{RI2}/R_{12}C_{R24}$$

$$S_5/S_1 = R_{52}C_{RI2}/R_{12}C_{R2}$$

$$S_6/S_1 = R_{62}C_{RI2}/R_{12}C_{R26}$$

$$S_7/S_1 = R_{72}C_{RI2}/R_{12}C_{R27}$$

$$S_8/S_1 = R_{82}C_{RI2}/R_{12}C_{R28}.$$

FIG. 7 shows the calibration procedure of the transmitting antenna array. Suppose first link (a) is the reference link (any link can be set as the reference link). The coupled circuits of all links expect the transmitting link are set as follow: the radio frequency switch 326 connects to its end 1; the radio frequency switch 323 connects to its end 2; the radio frequency switch 328 connects to its end 1. After that, every link is set at transmitting states in sequence; input a unit of transmitted data in baseband; and shut down all other links including their transmitters and power amplifiers. At the same time, all receivers are opened and work on the transmission frequency, except the receiver that couples with the transmitting link. Therefore, there are m−1 links at receiving states to receive the transmitted data above; and then the followings are obtained:

When the $i^{th}$ link transmits, other interface (x) receive signals as follow:

$$Rxi = Yi \times C_T xi \times Sx \quad x \neq i \qquad (15).$$

From this formula, m× (m−1) received signals are read, and the Rxi can be measured. Since $C_T$ matrix is known (the pre-calibration data), the ratio of the transmitting transmission-coefficient matrix of the transmitting links to the transmitting transmission-coefficient matrix of the reference link can be calculated, and the calibration is completed.

Suppose link z is the reference link, and steps in FIG. 7 are described in the following:

Step 601, The base station determines the transmission calibration time-slot;

Step 602, Set the first link as the reference link, and j=1;

Step 603, Let receivers of links x≠j work at the transmission frequency and the link is at receiving state; in their coupled circuits, radio frequency switch 326 connects to its end 1, radio frequency switch 323 connects to its end 2, and radio frequency switch 328 connects to its end 1;

Step 604, The transmitter of $j^{th}$ link transmits, and transmitters of other links are shut down;

Step 605, With the radio frequency/microwave vector network analyzer, the receiving matrix of the m−1 receivers $R_{xj}$ (x=1, 2 . . . m and x≠j) are measured;

Step 606, Detect whether j equals to m, if j=m, go to Step 608, and if j≠m, go to Step 607;

Step 607, Set j=j+1 and go to Step 603 until j=m;

Step 608, Calculate $Y_j/Y_z$ (the ratio of other links transmitting transmission-coefficient matrix to the reference link transmitting transmission-coefficient matrix Y) to implement real-time calibration;

Step 609, Record the calculation result, the real-time calibration is ended, and the base station recovers to the normal operation state.

As an example, the calculation formulas are given in the following, when the number of the antenna units of a smart antenna array equals to 3, 4, 6 and 8, respectively.

For an antenna array with three antenna units, all links, except the reference link, have the following formulas that show the ratio of the link transmitting transmission-coefficient matrix to the reference link transmitting transmission-coefficient matrix:

$$Y_2/Y_1 = R_{32}C_{T13}/R_{31}C_{T23} \qquad (16)$$

$$Y_3/Y_1 = R_{23}C_{T12}/R_{21}C_{T23}.$$

For an antenna array with four antenna units, all links, except the reference link, have the following formulas that show the ratio of the link transmitting transmission-coefficient matrix to the reference link transmitting transmission-coefficient matrix:

$$Y_2/Y_1 = R_{32}C_{T13}/R_{31}C_{T23} \qquad (17)$$

$$Y_3/Y_1 = R_{32}C_{T12}/R_{31}C_{T23}$$

$$Y_4/Y_1 = R_{32}C_{T13}/R_{31}C_{T23}.$$

For an antenna array with six antenna units, all links, except the reference link, have the following formulas that show the ratio of the link transmitting transmission-coefficient matrix to the reference link transmitting transmission-coefficient matrix:

$$Y_2/Y_1 = R_{32}C_{T13}/R_{31}C_{T23} \qquad (18)$$

$$Y_3/Y_1 = R_{32}C_{T13}/R_{31}C_{T23}$$

$$Y_4/Y_1 = R_{32}C_{T13}/R_{31}C_{T23}$$

$$Y_5/Y_1 = R_{32}C_{T13}/R_{31}C_{T23}$$

$$Y_6/Y_1 = R_{32}C_{T13}/R_{31}C_{T23}.$$

For an antenna array with eight antenna units, all links, except the reference link, have the following formulas that show the ratio of the link transmitting transmission-coefficient matrix to the reference link transmitting transmission-coefficient matrix:

$$Y_2/Y_1 = R_{32}C_{T13}/R_{31}C_{T23} \qquad (19)$$

$$Y_3/Y_1 = R_{32}C_{T13}/R_{31}C_{T23}$$

$$Y_4/Y_1 = R_{32}C_{T13}/R_{31}C_{T23}$$

$$Y_5/Y_1 = R_{32}C_{T13}/R_{31}C_{T23}$$

$$Y_6/Y_1 = R_{32}C_{T13}/R_{31}C_{T23}$$

$$Y_7/Y_1 = R_{32}C_{T13}/R_{31}C_{T23}$$

$$Y_8/Y_1 = R_{32}C_{T13}/R_{31}C_{T23}$$

Characteristics of the invention are as follows: the antenna array is pre-calibrated at the vendor to obtain transmission-coefficient matrix between antenna units; the transmission-coefficient matrix is stored in network management equipment of the mobile communication system, and then after installation said transmission-coefficient matrix is loaded into the base station; during operation of the base station, when calibration is expected at any time, a time-slot is determined first, then a transmission link transmits a fixed level signal (data) and other links receive the signal; based on the amplitude and phase of the received signals, the transmission-coefficient matrix and the reception-coefficient matrix of an antenna array, which are relative to the transmission-coefficient matrix of a reference link, can be calculated to perform calibration in real time.

The real-time calibration method for a smart antenna array not only can be used for TDD mode that has an antenna array for transmission and reception, but also can be used for FDD mode that has separated antenna arrays for transmission and reception, respectively. The method does not need any beacon antenna, coupled structure of the antenna array and a special calibration link.

The above embodiments are for a CDMA wireless communication system, but after simple revision, the method can be used for a FDMA and TDMA wireless communication system.

Engineers who work on the wireless communication system and know the basic principle of a smart antenna can make the real-time calibration for a smart antenna array after reading this description.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A real-time calibration method for a smart antenna array including N reception and transmission links, each link including an antenna unit and a radio frequency transceiver connected via a feeder cable, each radio frequency transceiver connecting to a digital signal processor, wherein the method comprises:
   A) before installation, pre-calibrating the smart antenna array to obtain a pre-calibration transmission-coefficient matrix between antenna units in the smart antenna array;
   B) after installation at site, loading the pre-calibration transmission-coefficient matrix into a base station to which the smart antenna array connects;
   C) while the base station is running, transmitting a unit calibration signal in sequence in a time-slot for every transmitting link of the base station, and at the same time, non-transmitting links of the smart antenna array, are in a reception state to receive the unit calibration signal, then measuring and recording the received unit calibration signal;
   D) with the received unit calibration signal and pre-calibration transmission-coefficient matrix, respectively calculating a ratio of a receiving transmission-coefficient matrix of each receiving link to a receiving transmission-coefficient matrix of a reference link, and respectively calculating a ratio of transmitting transmission-coefficient matrix of each transmitting link to a transmitting transmission-coefficient matrix of the reference link.

2. The real-time calibration method for a smart antenna array according to claim 1, step of pre-calibrating in Step A is performed with a radio frequency/microwave vector network analyzer, of which one end is connected with a transmitting antenna unit interface of the transmitting link and another end is connected with a receiving antenna unit interface of the receiving link;
   step of measuring the received unit calibration signal in Step C is performed with the radio frequency/microwave vector network analyzer, of which one end is connected with a transmitting antenna system interface of the transmitting link and another end is connected with a receiving antenna system interface of the receiving link.

3. The real-time calibration method for a smart antenna array according to claim 2, wherein the receiving antenna system interface is an interface between radio frequency transceiver of the receiving link and the digital signal processor, the transmitting antenna system interface is an interface between radio frequency transceiver of the transmitting link and the digital signal processor.

4. The real-time calibration method for a smart antenna array according to claim 1, wherein Step A comprises, measuring coupling characteristics between every antenna unit of the antenna array within a frequency range to obtain pre-calibration transmission-coefficient matrix of every antenna unit of said antenna array.

5. The real-time calibration method for a smart antenna array according to claim 1, wherein Step B comprises, first storing the pre-calibration transmission-coefficient matrix of every antenna unit of the antenna array in a network management equipment of a mobile communication system, and then loading the pre-calibration transmission-coefficient matrix to the base station to which the smart antenna array connects by the network management equipment.

6. The real-time calibration method for a smart antenna array according to claim 1, wherein the smart antenna array has N antenna units, and Step C executes N times taking N time-slots in one frame or different frames.

7. The real-time calibration method for a smart antenna array according to claim 1, the time-slot is an idle time-slot.

8. The real-time calibration method for a smart antenna array according to claim 1, the time-slot in step C is a Guard slot (G) between Downlink Pilot Time-Slot (DwPTS) and Uplink Pilot Time-Slot (UpPTS) in the frame for a TD-SCDMA system.

9. The real-time calibration method for a smart antenna array according to claim 1, wherein the smart antenna array is common for every transmission and reception link in a TDD-CDMA mobile communication system.

10. A real-time calibration method for a smart antenna array including transmission links having associated transmission units of a transmission antenna array and reception units of a reception antenna array, each pair of reception units and the transmission units including a respective transmitter and associated receiver and connecting to a coupled circuit via a fiber cable, each of receiver and associated transmitter of a transmission and receiver unit coupling via the coupled circuit and connecting to a digital signal processor, wherein the method compromises,
    A) before installation, pre-calibrating the smart antenna array to obtain a pre-calibration transmission-coefficient matrix between transmission and reception units in the smart antenna array;
    B) after installation at site, loading the pre-calibration transmission-coefficient matrix into a base station to which the smart antenna array connects;
    C) while the base station is running, transmitting a unit calibration signal in sequence in a time-slot for every transmitter, the transmitter and associated receiver defining a transmission link, and setting receivers not coupled to the first transmission link, each of the receivers and associated transmitters defining a reception link, to a reception state to receive the unit calibration signal, and measuring and recording the received unit calibration signal;
    D) with the received unit calibration signal and pre-calibration transmission-coefficient matrix, respectively calculating a ratio of a receiving transmission-coefficient matrix of each reception link to a receiving transmission-coefficient matrix of a reference link, and respectively calculating a ratio of transmitting transmission-coefficient matrix of each transmission link to a transmitting transmission-coefficient matrix of the reference link.

11. The real-time calibration method for a smart antenna array according to claim 10, wherein pre-calibrating further comprises, pre-calibrating reception units of the reception antenna array and transmission units of the transmission antenna array, respectively; loading further comprises, loading a pre-calibration transmission-coefficient matrix of the reception antenna array and a pre-calibration transmission-coefficient matrix of the transmission antenna array to the base station;
    loading further comprises,
    setting a selected receiver operating at a transmitting frequency range of a selected transmitter to receive a transmitted signal from the transmitter through the coupled circuit while calibrating the transmission antenna array, and
    setting a second selected transmitter operating at a receiving frequency range to transmit a signal that can be received by a second selected receiver through the coupled circuit while calibrating the reception antenna array;

wherein measuring and recording the received unit calibration signal further comprises, measuring the unit calibration signal received by reception links of the transmission antenna system, and measuring the unit calibration signal received by reception links of the reception antenna system.

12. The real-time calibration method for a smart antenna array according to claim 11, transmitting a unit calibration signal further comprises:

for real-time calibration of the reception antenna system, through control of the coupled circuit, coupling a reception unit of the transmitting link with the transmitter of the associated transmission unit; isolating reception units of all reception links not coupling with the transmitting link from transmitters of associated transmission units; and shutting down transmitter power amplifiers of all transmission units of the reception links;

for real-time calibration of the transmission antenna system, through control of the coupled circuit, coupling receivers of all the reception links with the receivers paired of the respective transmission units; isolating the transmission unit transmitter of the transmission link from the associated receiver, and shutting down transmitters and power amplifiers of the receiving links.

13. The real-time calibration method for a smart antenna array according to claim 10, wherein the coupled circuit comprises, setting the coupled circuit that includes a first, a second and a third coupler, a first, a second and a third radio frequency switch, a first and a second match resistance;

connecting said first coupler between the reception unit and its associated receiver, and further connecting said first coupler to end 1 of said first radio frequency switch; connecting end 2 of said first radio frequency switch to said first match resistance; and connecting said first radio frequency switch and said second radio frequency switch serially;

connecting end 1 of said second radio frequency switch to said second match resistance; connecting end 2 of said second radio frequency switch to said third radio frequency switch; connecting end 1 of said third radio frequency switch to the transmitting unit and output of the power amplifier in the transmitter through second coupler, and connecting end 2 of said third radio frequency switch to output of the transmitter unit in the transmitter through said third coupler;

wherein said first, second and third radio frequency switches are controlled by the base station.

14. The real-time calibration method for a smart antenna array according to claim 12, said coupler is a general radio frequency coupler with a coupling factor between −20 dB to −40 dB.

15. The real-time calibration method for a smart antenna array according to claim 10, wherein pre-calibrating is performed with a radio frequency/microwave vector network analyzer, of which one end is connected with a transmission unit interface and another end is connected with a reception antenna unit interface; and measuring the received unit calibration signal is performed with the radio frequency/microwave vector network analyzer, of which one end is connected with a transmission antenna system interface of the transmission link and another end is connected with a reception antenna system interface of the reception link.

16. The real-time calibration method for a smart antenna array according to claim 15, wherein the reception antenna system interface is an interface between a radio frequency transceiver of the reception link and the digital signal processor, and the transmission antenna system interface is an interface between a radio frequency transceiver of the transmission link and the digital signal processor.

17. The real-time calibration method for a smart antenna array according to claim 10, wherein loading further comprises, first storing the pre-calibration transmission-coefficient matrix of the transmission and reception units of the antenna array in a network management equipment of a mobile communication system, and then loading the pre-calibration transmission-coefficient matrix to the base station to which the smart antenna array connects by the network management equipment.

18. The real-time calibration method for a smart antenna array according to claim 10, wherein the smart antenna array has N transmission antenna units and N reception antenna units, and transmitting a unit calibration signal executes N times taking N time-slots in one frame or different frames, N is a positive integer.

19. The real-time calibration method for a smart antenna array according to claim 10, the time-slot is an idle time-slot.

20. The real-time calibration method for a smart antenna array according to claim 18, the time-slot is a Guard slot (G) between Downlink Pilot Time-Slot (DwPTS) and Uplink Pilot Time-Slot (UpPTS) in the frame for a TD-SCDMA system.

* * * * *